(12) United States Patent
Yoshioka et al.

(10) Patent No.: US 12,206,979 B2
(45) Date of Patent: Jan. 21, 2025

(54) COMPUTER-READABLE RECORDING MEDIUM STORING UPDATE PROGRAM, UPDATE METHOD, AND INFORMATION PROCESSING APPARATUS

(71) Applicant: FUJITSU LIMITED, Kawasaki (JP)

(72) Inventors: Takahiro Yoshioka, Tachikawa (JP); Takeshi Konno, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 402 days.

(21) Appl. No.: 17/828,228

(22) Filed: May 31, 2022

(65) Prior Publication Data

US 2023/0066717 A1    Mar. 2, 2023

(30) Foreign Application Priority Data

Aug. 31, 2021  (JP) ................................ 2021-141717

(51) Int. Cl.
| | |
|---|---|
| *H04N 23/617* | (2023.01) |
| *G06T 7/80* | (2017.01) |
| *G06V 10/74* | (2022.01) |
| *H04N 23/611* | (2023.01) |

(52) U.S. Cl.
CPC ............ *H04N 23/617* (2023.01); *G06T 7/80* (2017.01); *G06V 10/74* (2022.01); *H04N 23/611* (2023.01); *G06T 2207/30196* (2013.01)

(58) Field of Classification Search
CPC ...... H04N 23/617; H04N 23/611; G06T 7/80; G06T 2207/30196; G06V 10/74
USPC ........................................................ 382/286
See application file for complete search history.

(56) References Cited

U.S. PATENT DOCUMENTS

| | | | |
|---|---|---|---|
| 11,165,954 B1* | 11/2021 | Beach ..................... H04N 23/65 |
| 11,303,853 B2* | 4/2022 | Kallakuri ................. G06N 5/01 |
| 11,361,468 B2* | 6/2022 | Kallakuri ............ G06F 18/2148 |
| 2006/0053014 A1 | 3/2006 | Yoshizawa |
| 2013/0169822 A1* | 7/2013 | Zhu ........................... G06T 7/80 |
| | | | 348/180 |
| 2013/0243255 A1* | 9/2013 | Williams .............. A63F 13/428 |
| | | | 382/103 |
| 2015/0222812 A1* | 8/2015 | Murray ................ H04N 23/617 |
| | | | 348/222.1 |
| 2018/0075593 A1* | 3/2018 | Wang ................... G06V 40/103 |

(Continued)

FOREIGN PATENT DOCUMENTS

| | | |
|---|---|---|
| JP | 2005-227794 A | 8/2005 |
| JP | 2014-175782 A | 9/2014 |

OTHER PUBLICATIONS

Gaku Nakano, "Camera Calibration Using Parallel Line Segments", Central Research Labs, NEC Corporation, (Total 8 pages).

*Primary Examiner* — William D Titcomb
(74) *Attorney, Agent, or Firm* — Fujitsu Intellectual Property Center

(57) ABSTRACT

A non-transitory computer-readable recording medium stores an update program for causing a computer to execute processing including: setting a range of a height of a person included in an image frame imaged by a camera on the basis of position information where the camera is provided; specifying the height of the person included in the image frame on the basis of imaging information of the camera; and updating the imaging information on the basis of a height of a person that is not included in the range in a case where the specified height of the person is not included in the range.

9 Claims, 15 Drawing Sheets

(56) References Cited

U.S. PATENT DOCUMENTS

| | | | | |
|---|---|---|---|---|
| 2018/0374233 A1* | 12/2018 | Zhou | ............... | G06F 18/22 |
| 2019/0147598 A1* | 5/2019 | Sawai | ............... | H04N 5/272 |
| | | | | 382/283 |
| 2019/0266780 A1* | 8/2019 | Le | ............... | G06T 15/04 |
| 2020/0273200 A1* | 8/2020 | Ellwein | ............... | G06T 7/73 |
| 2021/0019914 A1* | 1/2021 | Lipchin | ............... | G06V 10/25 |
| 2021/0064857 A1* | 3/2021 | Semitsu | ............... | G06T 7/60 |
| 2021/0092286 A1* | 3/2021 | Kolesov | ............... | G06T 17/20 |
| 2021/0365707 A1* | 11/2021 | Mao | ............... | G06V 10/25 |
| 2022/0028114 A1* | 1/2022 | Lee | ............... | G06T 7/75 |
| 2022/0067962 A1* | 3/2022 | Daniels | ............... | G06T 11/203 |
| 2023/0012241 A1* | 1/2023 | Kolesov | ............... | H04N 23/63 |
| 2024/0104776 A1* | 3/2024 | Yoshida | ............... | G06T 7/70 |

\* cited by examiner

FIG. 8

| RANGE OF TERRITORY | AVERAGE HEIGHT |
|---|---|
| RANGE OF TERRITORY OF JAPAN | 172cm |
| RANGE OF TERRITORY OF U.S. | 176cm |
| RANGE OF TERRITORY OF GERMANY | 180cm |
| RANGE OF TERRITORY OF CHINA | 166cm |
| ... | ... |

143

COMPUTER-READABLE RECORDING MEDIUM STORING UPDATE PROGRAM, UPDATE METHOD, AND INFORMATION PROCESSING APPARATUS

CROSS-REFERENCE TO RELATED APPLICATION

This application is based upon and claims the benefit of priority of the prior Japanese Patent Application No. 2021-141717, filed on Aug. 31, 2021, the entire contents of which are incorporated herein by reference.

FIELD

The embodiment discussed herein is related to an update program or the like.

BACKGROUND

A video imaged by a camera is used for various investigations and may be important information. For example, by analyzing an image of the camera, it is possible to estimate not only clothes and a hairstyle of a specific person but also a feature amount such as a height.

Gaku Nakano "Camera Calibration Using Parallel Line Segments" Central Research Labs, NEC Corporation is disclosed as related art.

SUMMARY

According to an aspect of the embodiments, a non-transitory computer-readable recording medium stores an update program for causing a computer to execute processing including: setting a range of a height of a person included in an image frame imaged by a camera on the basis of position information where the camera is provided; specifying the height of the person included in the image frame on the basis of imaging information of the camera; and updating the imaging information on the basis of a height of a person that is not included in the range in a case where the specified height of the person is not included in the range.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating an example of a data structure of an attribute table;

DESCRIPTION OF EMBODIMENTS

In order to estimate the height of the person from the image of the camera, parameters of a position of the camera and a lens are used. However, there is a low possibility that a parameter of an installed camera is recorded. In the following description, the parameter regarding the camera is appropriately referred to as a "camera parameter".

As a technique for estimating a camera parameter, there is the related art for estimating the camera parameter using a segment (height) with a known length. In this related art, in a case where the length of the segment is unknown, a segment with an unknown length is included in an imaging range of the camera, and the length of the segment is also estimated as one of parameters as well as the camera parameter.

Figure 15:
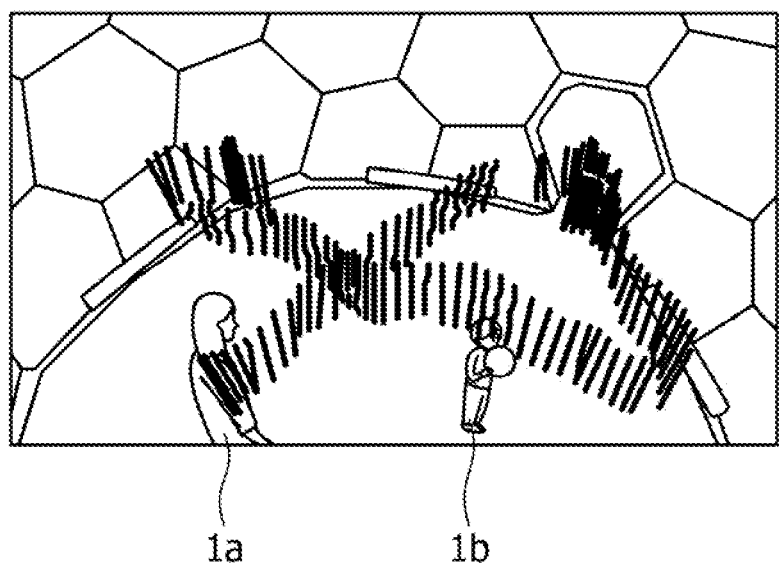
FIG. 15 is a diagram for explaining the related art.

FIG. 15 is a diagram for explaining the related art. In the related art, in a case where a height of a person $1a$ is known, a camera parameter is estimated using that the known height is fixed even if the person $1a$ moves in an imaging range. On the other hand, in a case where the height of the person $1a$ is not known, the height of the person $1a$ is estimated as one of parameters as well as the camera parameter using that an unknown height is fixed in a video in which the person $1a$ comprehensively moves within the imaging range. In a case where a moving range of the person $1a$ is insufficient, using a video in which another person $1b$ whose height is unknown moves, the heights of the persons $1a$ and $1b$ are also estimated as the camera parameters as well as the camera parameter.

However, the related art described above has a problem in that it is not possible to estimate a camera parameter and calculate a height of a person.

For example, with the related art described with reference to FIG. 15, in a case where the height of the person $1a$ is unknown, the video is used in which the person $1a$ comprehensively moves within the imaging range. However, it is difficult to acquire the video in which the person $1a$ comprehensively moves within the imaging range. Furthermore, although it is possible to use a video in which a plurality of persons moves, the number of camera parameters to be estimated increases, and there is a case where the camera parameter is not converged to an appropriate camera parameter.

In one aspect, an object of the embodiment is to provide an update program, an update method, and an information processing apparatus that can calculate a feature amount of a person.

Hereinafter, embodiments of an update program, an update method, and an information processing apparatus disclosed in the present application will be described in detail with reference to the drawings. Note that the embodiment does not limit the present invention.

Embodiment

Figure 1:
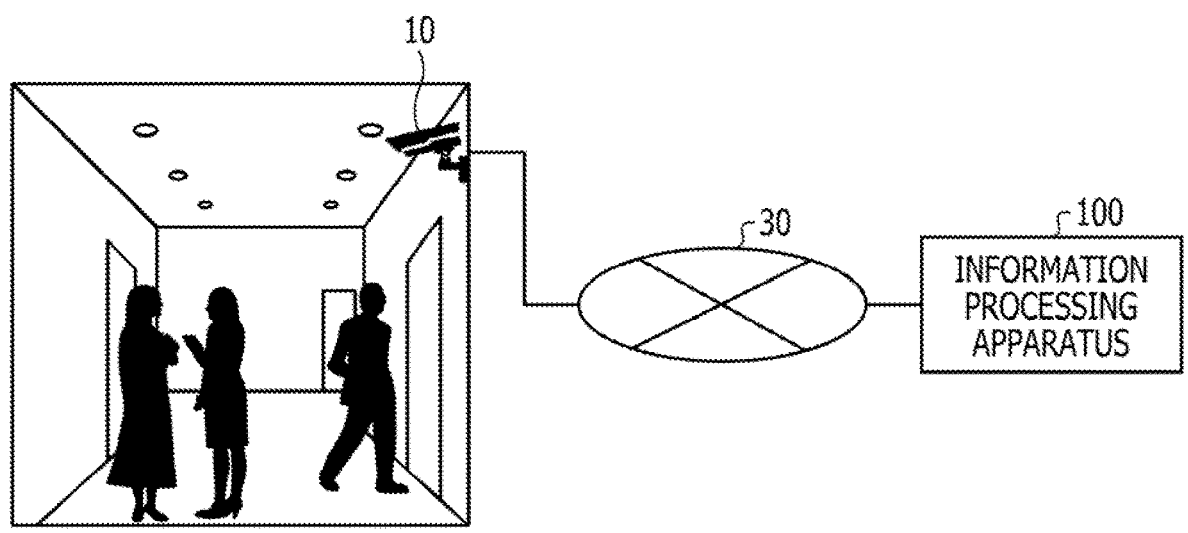
FIG. 1 is a diagram illustrating an example of a system according to the present embodiment.

FIG. 1 is a diagram illustrating an example of a system according to the present embodiment. As illustrated in FIG. 1, this system includes a camera 10 and an information processing apparatus 100. The camera 10 and the information processing apparatus 100 are connected to each other via a network 30. In the example illustrated in FIG. 1, only the camera 10 is illustrated. However, the system according to the present embodiment may include another camera.

The camera 10 images a video in an imaging range and transmits data of the imaged video to the information processing apparatus 100. In the following description, the data of the video transmitted by the camera 10 to the information processing apparatus 100 is referred to as video data. In the present embodiment, description will be made using video data in which a person is imaged.

Figure 2:
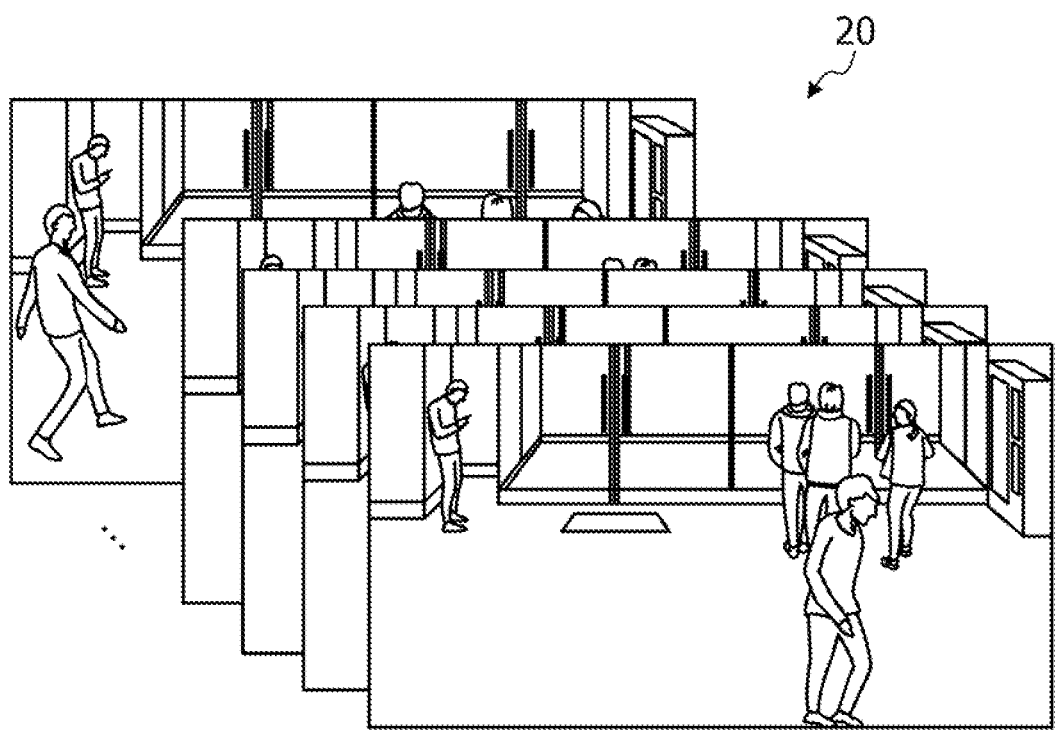
FIG. 2 is a diagram illustrating an example of video data.

FIG. 2 is a diagram illustrating an example of video data. As illustrated in FIG. 2, video data 20 includes a plurality of time-series image frames. A frame number is assigned to each image frame in a time-series ascending order. One image frame is a still image imaged by the camera 10 at a certain timing.

The camera 10 transmits position data of a place where the camera 10 is provided to the information processing apparatus 100. For example, the camera 10 measures a latitude and a longitude using a global positioning system (GPS) function and transmits the measured latitude and longitude to the information processing apparatus 100 as the position data. An administrator of the camera 10 may set the position data in the camera 10 in advance.

The information processing apparatus 100 acquires the position data and the video data 20 from the camera 10 and allocates a temporary average height specified from the position data to each person included in the image frame of the video data 20 so as to estimate a camera parameter. The information processing apparatus 100 extracts a person whose height, specified from an estimation result of the camera parameter, is not included in a predetermined range as with reference to the average height. By recalculating the camera parameter using the height of the extracted person, the information processing apparatus 100 repeatedly executes processing for adjusting the camera parameter and determines the camera parameter.

The information processing apparatus 100 calculates the height of the person included in the video data 20 on the basis of the determined camera parameter. In the present embodiment, a case will be described where the height of the person is calculated. However, another feature amount of the person may be calculated. For example, the information processing apparatus 100 may calculate a length of a predetermined portion of the person or the like. The camera parameter is an example of imaging information.

Figure 3:
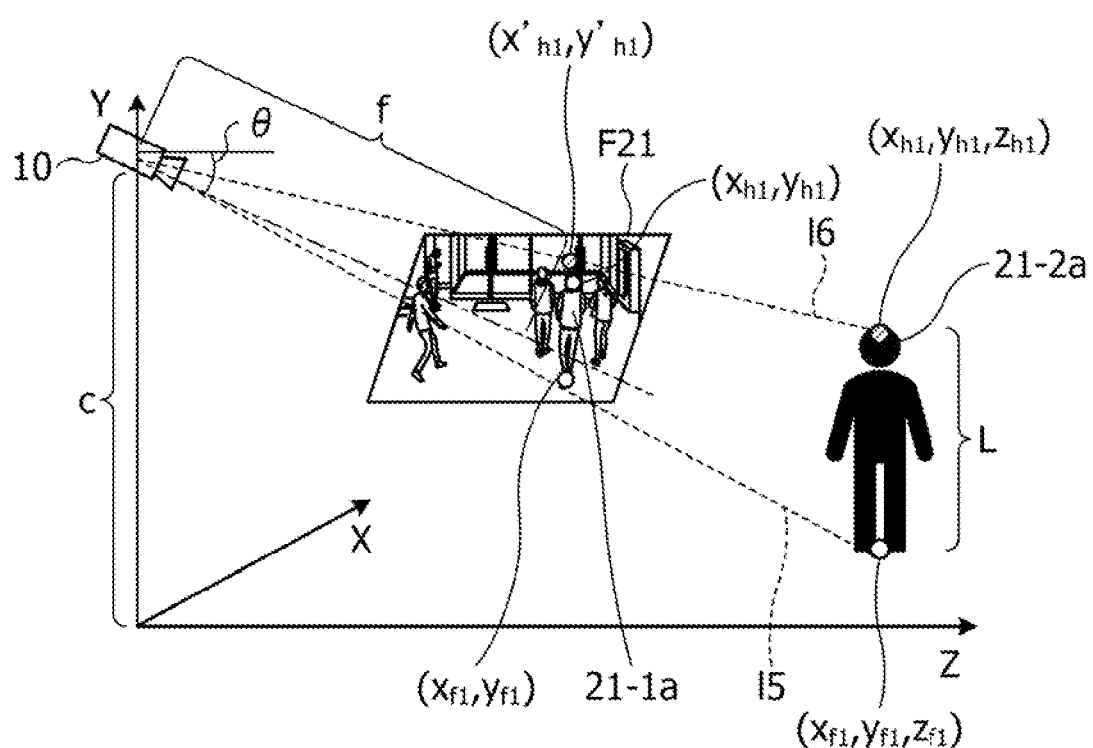
FIG. 3 is a diagram (1) for explaining processing of an information processing apparatus according to the present embodiment.
Figure 4:
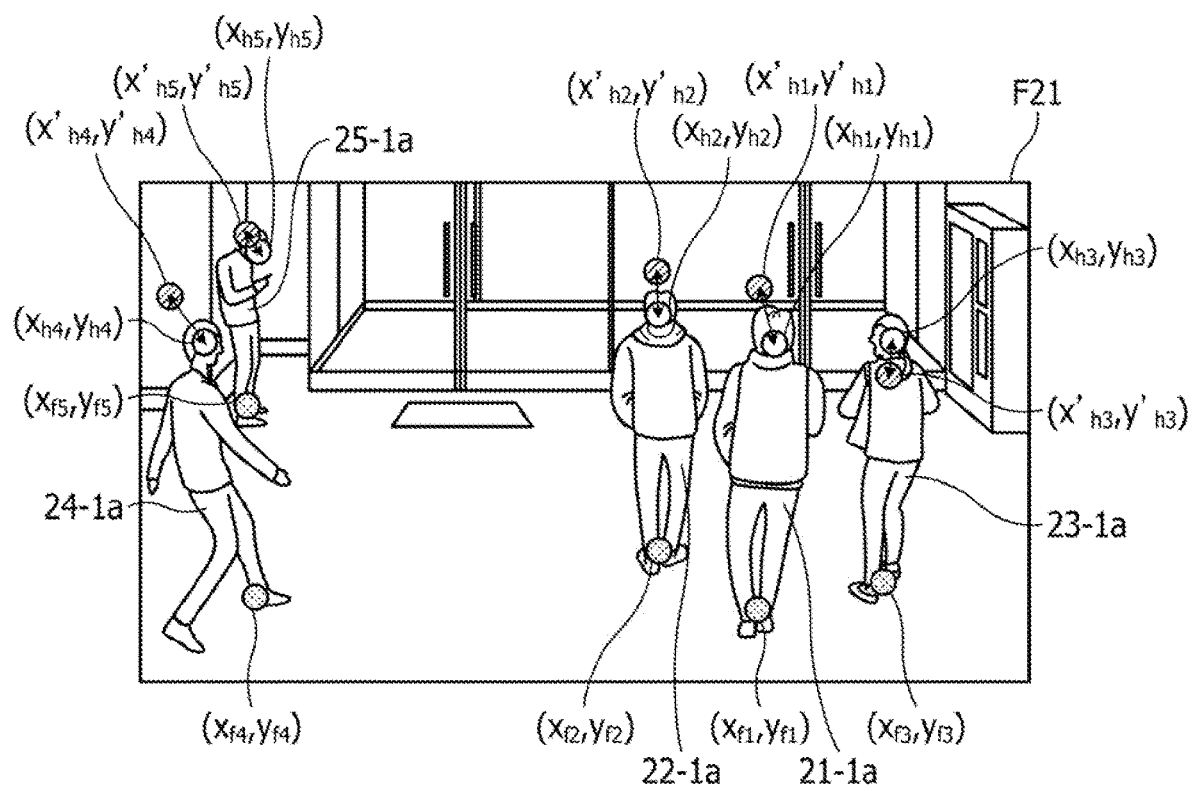
FIG. 4 is a diagram (2) for explaining the processing of the information processing apparatus according to the present embodiment.
Figure 5:
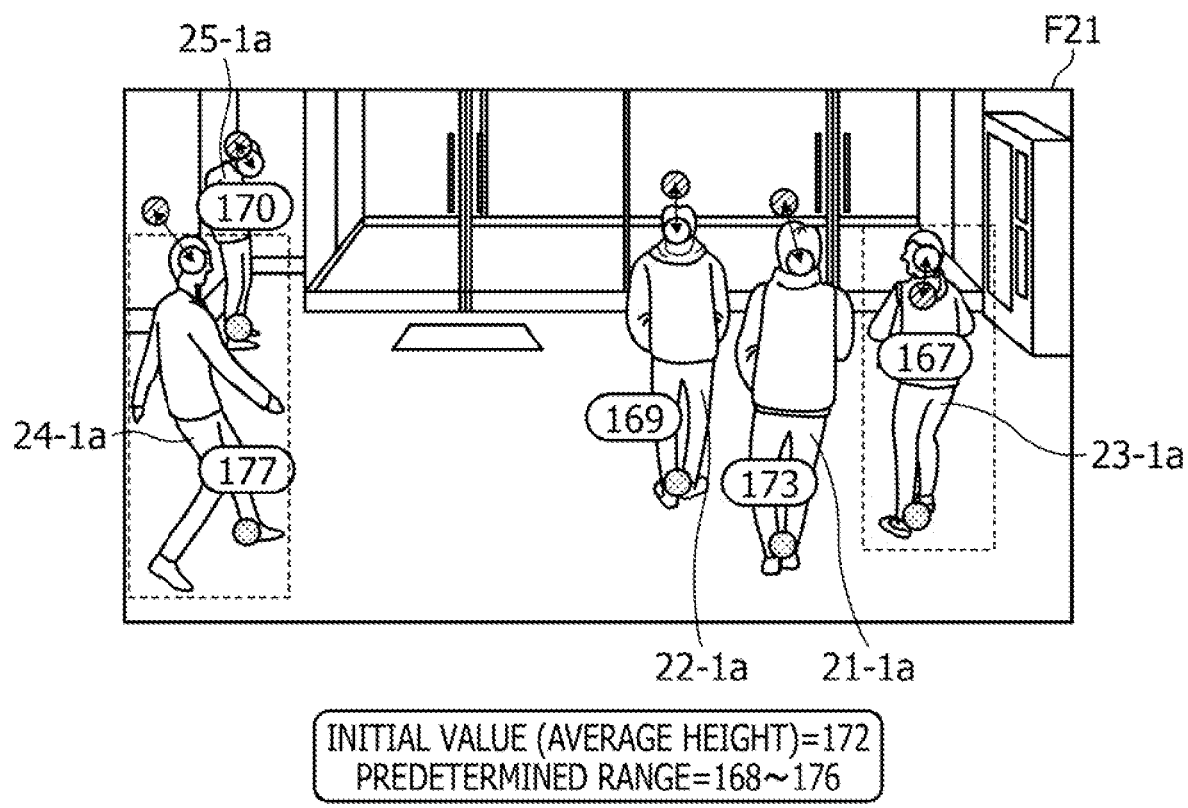
FIG. 5 is a diagram (3) for explaining the processing of the information processing apparatus according to the present embodiment.

FIGS. 3 to 5 are diagrams for explaining processing of the information processing apparatus according to the present embodiment. FIG. 3 will be described. In FIG. 3, an image frame F21 among the plurality of image frames included in the video data 20 will be used for description.

A coordinate system of the image frame F21 is an image coordinate system (x, y). A coordinate system in which a person actually exists is a world coordinate system (X, Y, Z). In the following description, a person in the image coordinate system imaged in the image frame F21 is referred to as a person 21-1a, and a person in the world coordinate system is referred to as a person 21-2a.

The camera parameters of the camera 10 include a height c of the camera 10, an angle θ of the camera 10, and a focal distance f of the camera 10. The camera parameter of the camera 10 is set to be unknown, and the information processing apparatus 100 presets a predetermined initial value to the camera parameter. Note that the camera parameter is not limited to these and may be another parameter that can define a geometric relationship. For example, the another parameter includes an intersection point of an optical axis and an image (optical axis center coordinates), a rotation angle of a camera, or the like.

The information processing apparatus 100 specifies skeleton data of the person 21-1a by analyzing the image frame F21. For example, the information processing apparatus 100 specifies the skeleton data of the person 21-1a by inputting the image frame F21 into a machine-learned learning model. The learning model used by the information processing apparatus 100 will be described later.

The skeleton data includes information regarding a plurality of joints of a person, and each joint is associated with coordinates in an image frame. For example, the skeleton data corresponding to the image frame F21 includes coordinates $(x_{h1}, y_{h1})$ of the head of the person 21-1a, coordinates $(x_{f1}, y_{f1})$ of the foot of the person 21-1a, or the like.

The information processing apparatus 100 includes an attribute table, and the attribute table is associated with a range of a territory of each country and an average height of persons living in the country. The information processing apparatus 100 specifies an average height of persons in a country in which the camera 10 is provided (average height of persons imaged in image frame F21) on the basis of the position data received from the camera 10 and the attribute table.

The information processing apparatus 100 projects the coordinates $(x_{f1}, y_{f1})$ of the foot in the image coordinate system on coordinates in the world coordinate system on the basis of the camera parameter of the camera 10. For example, the information processing apparatus 100 calculates an intersection point $(X_{f1}, Y^{f1}, Z_{f1})$ between a segment l5 passing through the camera 10 and the coordinates $(x_{f1}, y_{f1})$ of the foot of the person 21-1a and an XZ plane of the world coordinate system as coordinates of the foot of the person 21-2a in the world coordinate system.

The information processing apparatus 100 allocates a height (average height) L specified on the basis of the position data and attribute information to the person 21-2a in the world coordinate system. The information processing apparatus 100 calculates coordinates $(X_{h1}, Y_{h1}, Z_{h1})$ of the head of the person 21-2a on the basis of the coordinates of the foot of the person 21-2a and the height L.

The information processing apparatus 100 backprojects the coordinates $(X_{h1}, Y_{h1}, Z_{h1})$ of the head in the world coordinate system on coordinates in the image coordinate system on the basis of the camera parameter of the camera 10. For example, the information processing apparatus 100 calculates coordinates $(x'_{f1}, y'_{f1})$ of an intersection point between a segment I6 passing through the camera 10 and the coordinates $(X_{h1}, Y_{h1}, Z_{h1})$ of the head of the person 21-2a and the plane of the image coordinate system and assumes the calculated coordinates as coordinates of the head of the person 21-1a in the image coordinate system.

The information processing apparatus 100 sets a distance from the coordinates $(x_{f1}, y_{f1})$ of the foot in the image coordinate system to the coordinates $(x'_{f1}, y'_{f1})$ as a "first feature amount". The first feature amount corresponds to a height of the person 21-1a estimated on the basis of the allocated height L and the camera parameter of the camera 10.

The information processing apparatus 100 sets a distance from the coordinates $(x_{f1}, y_{f1})$ of the foot in the image coordinate system to the coordinates $(x_{h1}, y_{h1})$ of the head as a "second feature amount". The second feature amount corresponds to the height of the person 21-1a estimated on the basis of the skeleton data.

The description proceeds to FIG. 4. The information processing apparatus 100 assigns the height L, similarly to the person 21-1a, to other persons 22-1a, 23-1a, 24-1a, and 25-1a included in the image frame F21 and sets each of a first feature amount and a second feature amount of each of the persons 22-1a to 25-1a. The heights L assigned to the respective persons 21-1a to 25-1a at the first time are the same height (average height).

Coordinates of the foot in the image coordinate system obtained from skeleton data of the person 22-1a are set as $(x_{f2}, y_{f2})$, and coordinates of a head are assumed as $(x_{h2}, y_{h2})$. Coordinates of a head obtained using the camera parameter and the height L are assumed as $(x'_{f2}, y'_{f2})$. The first feature amount of the person 22-1a is a distance from the coordinates $(x_{f2}, y_{f2})$ to the coordinates $(x'_{f2}, y'_{f2})$. The second feature amount of the person 22-1a is a distance from the coordinates $(x_{f2}, y_{f2})$ to the coordinates $(x_{h2}, y_{h2})$ of the head.

Coordinates of the foot in the image coordinate system obtained from skeleton data of the person 23-1a are set as $(x_{f3}, y_{f3})$, and coordinates of a head are assumed as $(x_{h3}, y_{h3})$. Coordinates of a head obtained using the camera parameter and the height L are assumed as $(x'_{f3}, y'_{f3})$. The first feature amount of the person 23-1a is a distance from the coordinates $(x_{f3}, y_{f3})$ to the coordinates $(x'_{f3}, y'_{f3})$. The second feature amount of the person 23-1a is a distance from the coordinates $(x_{f3}, y_{f3})$ to the coordinates $(x_{h3}, y_{h3})$ of the head.

Coordinates of the foot in the image coordinate system obtained from skeleton data of the person 24-1a are set as $(x_{f4}, y_{f4})$, and coordinates of a head are assumed as $(x_{h4}, y_{h4})$. Coordinates of a head obtained using the camera parameter and the height L are assumed as $(x'_{f4}, y'_{f4})$. The first feature amount of the person 24-1a is a distance from the coordinates $(x_{f4}, y_{f4})$ to the coordinates $(x'_{f4}, y'_{f4})$. The second feature amount of the person 24-1a is a distance from the coordinates $(x_{f4}, y_{f4})$ to the coordinates $(x_{h4}, y_{h4})$ of the head.

Coordinates of the foot in the image coordinate system obtained from skeleton data of the person 25-1a are set as $(x_{f5}, y_{f5})$, and coordinates of a head are assumed as $(x_{h5}, y_{h5})$. Coordinates of a head obtained using the camera parameter and the height L are assumed as $(x'_{f5}, y'_{f5})$. The first feature amount of the person 25-1a is a distance from the coordinates $(x_{f5}, y_{f5})$ to the coordinates $(x'_{f5}, y'_{f5})$. The second feature amount of the person 25-1a is a distance from the coordinates $(x_{f5}, y_{f5})$ to the coordinates $(x_{h5}, y_{h5})$ of the head.

The information processing apparatus optimizes the camera parameter of the camera 10 so as to reduce a difference between the first feature amount and the second feature amount for each of the persons 21-1a to 25-1a in a state where the heights L of the persons 21-1a to 25-1a are fixed.

The description proceeds to FIG. 5. The information processing apparatus calculates a height of each of the persons 21-1a to 25-1a on the basis of the camera parameter optimized through the processing described above. The information processing apparatus specifies a person whose calculated height is not included in a predetermined range from among the persons 21-1a to 25-1a. For example, the predetermined range is assumed as an "initial value (average height)±4". In a case of optimizing the camera parameter for the second and subsequent times, the information processing apparatus uses information regarding the person whose calculated height is not included in the predetermined range.

In the example illustrated in FIG. 5, the heights of the persons 21-1a to 25-1a calculated on the basis of the optimized camera parameter are respectively assumed as "173", "169", "167", "177", and "170". When an initial value is assumed as 172, the predetermined range is "168 to 176". Then, the information processing apparatus specifies the person 23-1a with the height "167" and the person 24-1a with the height "177" as the persons whose height is not included in the predetermined range.

In a case where the height of the specified person is equal to or higher than the initial value, the information processing apparatus adds a predetermined value to the height of the person and sets the height on which the addition has been performed as a second initial value. In a case where the height of the specified person is lower than the initial value, the information processing apparatus subtracts a predetermined value from the height of the person and sets the height on which the subtraction has been performed as the second initial value. The predetermined value is assumed as one.

For example, the height of the person 23-1a is "167" that is lower than the initial value. Therefore, the information processing apparatus sets "166" to the height L of the person 23-1a as the second initial value. The height of the person 24-1a is "177" that is equal to or higher than the initial value. Therefore, the information processing apparatus sets "178" to the height L of the person 24-1a as the second initial value.

The information processing apparatus optimizes the camera parameter of the camera 10 so as to reduce a difference between the first feature amount and the second feature amount for each of the persons 23-1a and 24-1a in a state where the heights L of the persons 23-1a and 24-1a are fixed. An initial value of a second camera parameter is assumed as an estimation result of a first camera parameter.

As described above, the information processing apparatus allocates a temporary average height to each person and estimates the camera parameter in the first processing. The information processing apparatus 100 extracts a person whose height, specified from the estimation result of the camera parameter, is not included in the predetermined range with reference to the average height. The information processing apparatus 100 determines the camera parameter by recalculating the second and subsequent camera parameters using the height of the extracted person. As a result, it is possible set the camera parameter, used to accurately calculate the height of the person, to the camera 10.

The information processing apparatus specifies the person whose height is not included in the predetermined range with reference to the average height, resets the height of the person, recalculates the camera parameter. Even in a case where a person whose height deviates from a statistical average value exists, the camera parameter can be converged.

Even if the heights of all the persons included in the image frame are unknown, the information processing apparatus can estimate the height of each person.

Figure 6:
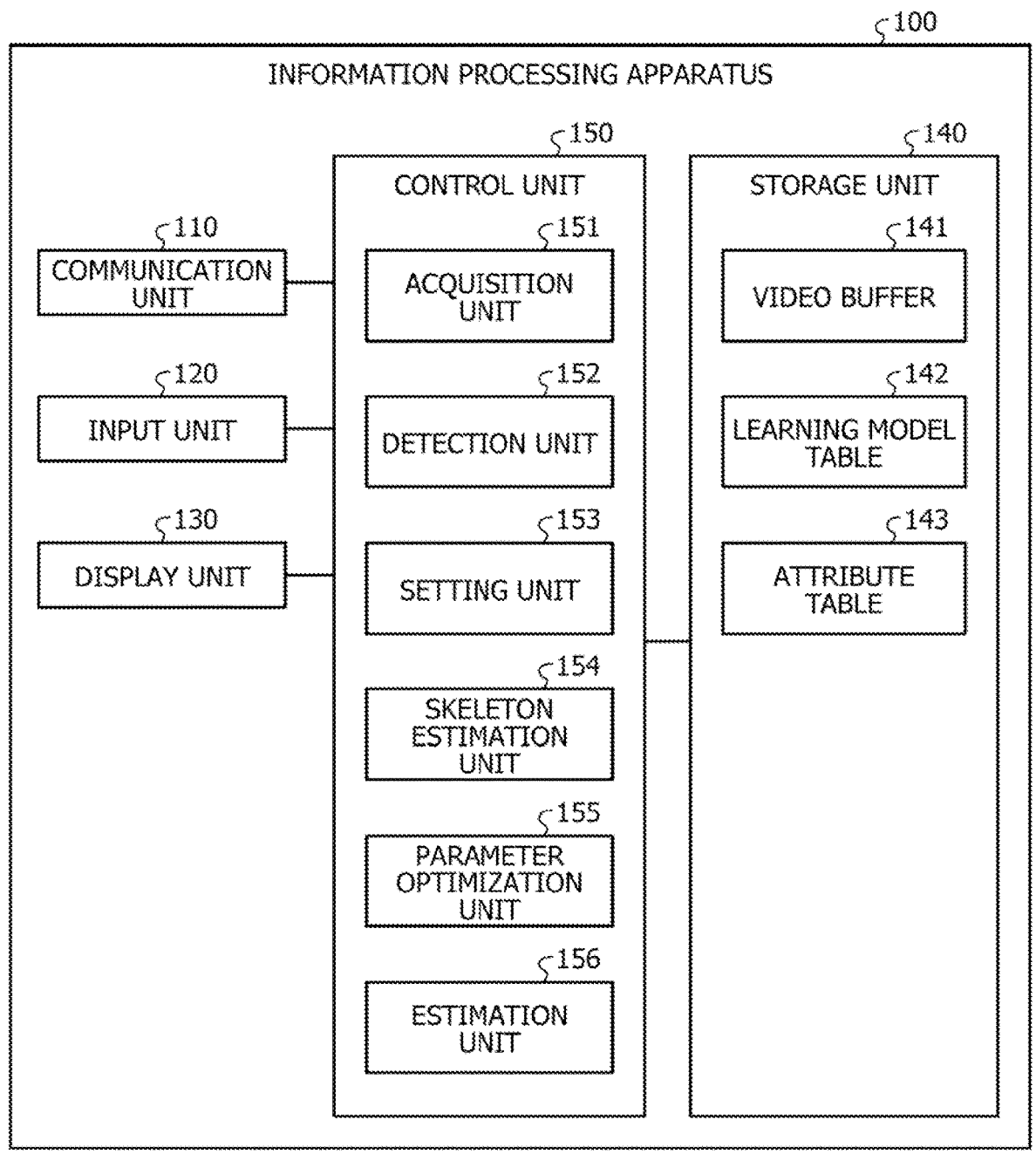
FIG. 6 is a functional block diagram illustrating a configuration of the information processing apparatus according to the present embodiment.

Next, an example of a configuration of the information processing apparatus 100 according to the present embodiment will be described. FIG. 6 is a functional block diagram illustrating a configuration of the information processing apparatus according to the present embodiment. As illustrated in FIG. 6, the information processing apparatus 100 includes a communication unit 110, an input unit 120, a display unit 130, a storage unit 140, and a control unit 150.

The communication unit 110 is connected to the camera 10 via the network 30 and receives video data. For example, the communication unit 110 is implemented by a network interface card (NIC) or the like. The communication unit 110 may be connected to another external device or the like via the network 30.

The input unit 120 is an input device that inputs various types of information to the information processing apparatus 100. The input unit 120 corresponds to a keyboard, a mouse, a touch panel, or the like.

The display unit 130 is a display device that displays information output from the control unit 150. The display unit 130 corresponds to a liquid crystal display, an organic electro luminescence (EL) display, a touch panel, or the like.

The storage unit 140 includes a video buffer 141, a learning model table 142, and an attribute table 143. The storage unit 140 is implemented, for example, by a semiconductor memory element such as a random access memory (RAM) or a flash memory (flash memory) or a storage device such as a hard disk or an optical disk.

The video buffer 141 is a buffer that stores the video data 20 transmitted from the camera 10. The video data 20 includes a plurality of time-series image frames. It is assumed that a frame number be assigned to each image frame in a time-series ascending order.

Figure 7:
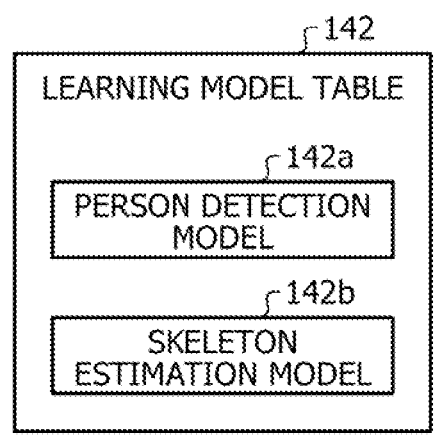
FIG. 7 is a diagram illustrating an example of a data structure of a learning model table.

The learning model table 142 is a table that includes various learning models. FIG. 7 is a diagram illustrating an example of a data structure of a learning model table. As illustrated in FIG. 7, the learning model table 142 includes a person detection model 142a and a skeleton estimation model 142b.

The person detection model 142a is a machine learning model that detects a region of a person included in an image frame when inputting the time-series image frames included in video data and tracks the region of the person. A person ID used to identify a person is allocated to a person detected from an image frame. The person detection model 142a is implemented by a machine learning model such as Deep-Sort.

The skeleton estimation model 142b is a machine learning model that, when inputting a region (whole body image) of a person in an image frame, outputs skeleton data of the person. The skeleton estimation model 142b can be implemented by a machine learning model such as OpenPose.

The person detection model 142a and the skeleton estimation model 142b correspond to a neural network (NN) or the like. It is assumed that each of the person detection model 142a and the skeleton estimation model 142b be machine learned in advance on the basis of a learning dataset.

The attribute table 143 is a table that defines a relationship between a range of a territory of each country and an average height of persons living in the country. FIG. 8 is a diagram illustrating an example of a data structure of an attribute table. As illustrated in FIG. 8, the attribute table 143 associates the range of the territory with the average height. The range of the territory indicates a range of the territory of the country. The range of the territory is designated by a latitude and a longitude. The average height indicates an average height of persons living in the range of the territory. For example, it is indicated that an average height corresponding to a range of a territory "range of territory of Japan" is "172 cm". This means that an average height of persons imaged by a camera provided in the territory of Japan is 172 cm.

The description returns to FIG. 6. The control unit 150 includes an acquisition unit 151, a detection unit 152, a setting unit 153, a skeleton estimation unit 154, a parameter optimization unit 155, and an estimation unit 156. The control unit 150 is implemented by, for example, a central processing unit (CPU) or a micro processing unit (MPU). Furthermore, the control unit 150 may be executed by, for example, an integrated circuit such as an application specific integrated circuit (ASIC), a field programmable gate array (FPGA), or the like.

The acquisition unit 151 acquires the video data 20 from the camera 10 via the communication unit 110. The acquisition unit 151 registers the acquired video data 20 in the video buffer 141. While the camera 10 is performing imaging, the acquisition unit 151 continuously acquires the video data 20 and registers the video data 20 in the video buffer 141.

Figure 9:
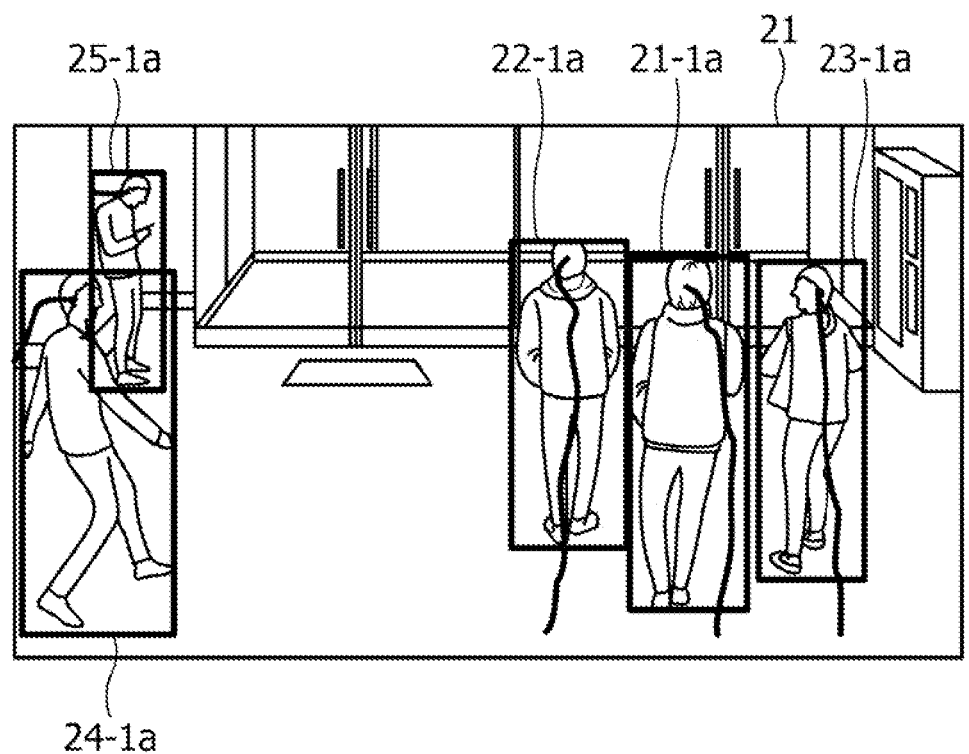
FIG. 9 is a diagram illustrating an example of a person detection result.

The detection unit 152 acquires image frames in a time-series manner from the video buffer 141 and inputs the image frame into the person detection model 142a so as to detect a region of a person included in the image frame. FIG. 9 is a diagram illustrating an example of a person detection result. In the example illustrated in FIG. 9, respective regions of the persons 21-1a to 25-1a are detected from the image frame F21. Person IDs are allocated to the regions of the persons 21-1a to 25-1a.

The detection unit 152 outputs information regarding the detection result to the skeleton estimation unit 154 and the parameter optimization unit 155. The information regarding the detection result includes information regarding a region of a person (image in region), a person ID allocated to each region, and a frame number of an image frame, or the like.

The detection unit 152 repeatedly executes the processing described above in a time-series manner for each image frame of the video data 20 stored in the video buffer 141.

The setting unit 153 specifies the average height of the persons in the range of the territory of the country where the camera 10 is provided on the basis of the position data acquired from the camera 10 and sets a predetermined range with reference to the specified average height. Hereinafter, an example of processing of the setting unit 153 will be described.

The setting unit 153 compares the position data acquired from the camera 10 with the attribute table 143, specifies the range of the territory including the latitude and the longitude of the position data, and specifies the average height corresponding to the range of the specified range. The setting unit 153 assumes the predetermined range as an "average height ±4". For example, in a case where the latitude and the longitude of the position data are included in the range of the territory of Japan, the setting unit 153 specifies the average height "172" and assumes the predetermined range as "168 to 176".

By the way, the setting unit 153 may specify attribute data of the person imaged by the camera 10 on the basis of the position data and set the predetermined range on the basis of the attribute data. For example, the setting unit 153 holds a race table that associates the position data and a race of a person living at the position data and specifies the race of the person on the basis of the race table and the position data as the attribute data. The setting unit 153 specifies an average height corresponding to the specified race and sets a predetermined range with reference to the specified average height. It is assumed that the average height corresponding to the race be preset to the table.

The setting unit 153 outputs data of the average height and data of the predetermined range to the parameter optimization unit 155.

Figure 10:
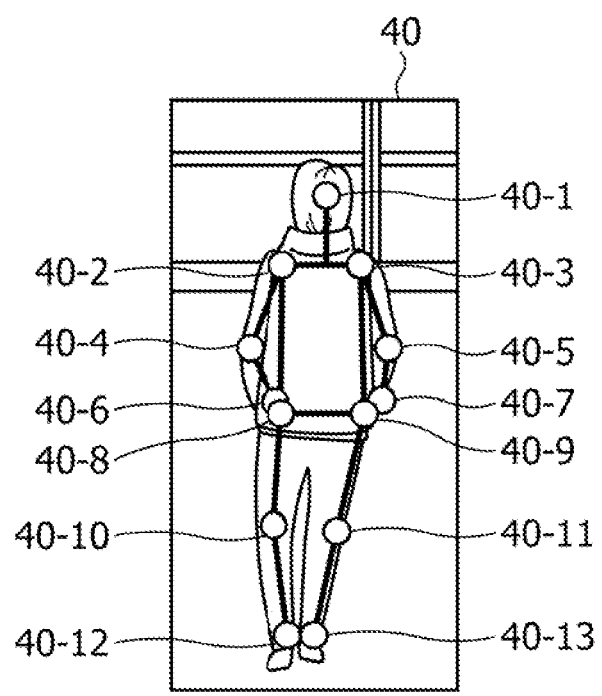
FIG. 10 is a diagram illustrating an example of a skeleton estimation result.

The skeleton estimation unit 154 estimates a skeleton of a person by inputting the information regarding the region of the person (whole body image) included in the information regarding the detection result into the skeleton estimation model 142b. FIG. 10 is a diagram illustrating an example of a skeleton estimation result. As illustrated in FIG. 10, a skeleton estimation result 40 includes a plurality of joints 40-1 to 40-13. Although not illustrated, each of the joints 40-1 to 40-13 includes coordinates in the image coordinate system and a type of the joint. For example, the joint 40-1 corresponds to the head. The joint 40-12 (40-13) corresponds to the foot.

The skeleton estimation unit 154 estimates a skeleton for the region of each person included in the information regarding the detection result. The skeleton estimation unit 154 generates skeleton data in which a person ID is associated with a person's skeleton estimation result and outputs the skeleton data to the parameter optimization unit 155 and the estimation unit 156.

The skeleton estimation unit 154 repeatedly executes the processing described above each time when acquiring the information regarding the detection result from the detection unit 152.

The parameter optimization unit 155 is a processing unit that optimizes a camera parameter by executing the following processing. Processing of the parameter optimization unit 155 will be described with reference to FIG. 3. The parameter optimization unit 155 specifies the coordinates $(x_{h1}, y_{h1})$ of the head of the person 21-1a and the coordinates $(x_{f1}, y_{f1})$ of the foot on the basis of the skeleton data.

The parameter optimization unit 155 projects the coordinates $(x_{f1}, y_{f1})$ of the foot in the image coordinate system on coordinates in the world coordinate system on the basis of the camera parameter of the camera 10. For example, the parameter optimization unit 155 calculates the intersection point $(X_{f1}, Y_{f1}, Z_{f1})$ between the segment I5 passing through the camera 10 and the coordinates $(x_{f1}, y_{f1})$ of the foot of the person 21-1a and the XZ plane of the world coordinate system as the coordinates of the foot of the person 21-2a in the world coordinate system.

The parameter optimization unit 155 allocates the height (average height) L acquired from the setting unit 153 to the person 21-2a in the world coordinate system. The parameter optimization unit 155 calculates the coordinates $(X_{h1}, Y_{h1}, Z_{h1})$ of the head of the person 21-2a on the basis of the coordinates of the foot of the person 21-2a and the height L.

The parameter optimization unit 155 backprojects the coordinates $(X_{h1}, Y_{h1}, Z_{h1})$ of the head in the world coordinate system on coordinates in the image coordinate system on the basis of the camera parameter of the camera 10. For example, the parameter optimization unit 155 calculates the coordinates $(x'_{f1}, y'_{f1})$ of the intersection point between the segment I6 passing through the camera 10 and the coordinates $(X_{h1}, Y_{h1}, Z_{h1})$ of the head of the person 21-2a with the plane of the image coordinate system and assumes the calculated coordinates as the coordinates of the head of the person 21-1a in the image coordinate system.

The parameter optimization unit 155 sets the first feature amount and the second feature amount of the person 21-1a on the basis of the result of the processing described above. The parameter optimization unit 155 assigns the height L, similarly to the person 21-1a, to the other persons 22-1a, 23-1a, 24-1a, and 25-1a included in the image frame F21 and sets each of the first feature amount and the second feature amount of each of the persons 22-1a to 25-1a. The heights L assigned to the respective persons 21-1a to 25-1a at the first time are the same height (average height).

The parameter optimization unit 155 optimizes the camera parameter of the camera 10 so as to reduce a difference between the first feature amount and the second feature amount for each of the persons 21-1a to 25-1a in a state where the heights L of the persons 21-1a to 25-1a are fixed.

Subsequently, the parameter optimization unit 155 calculates a height of each of the persons 21-1a to 25-1a on the basis of the camera parameter optimized through the processing described above. The parameter optimization unit 155 specifies a person whose calculated height is not included in a predetermined range from among the persons 21-1a to 25-1a. For example, the predetermined range is assumed as an "initial value (average height) ±4". In a case of optimizing the camera parameter the second and subsequent times, the parameter optimization unit 155 uses information regarding the person whose calculated height is not included in the predetermined range.

For example, processing of the parameter optimization unit 155 will be described with reference to FIG. 5. The parameter optimization unit 155 respectively assumes the heights of the persons 21-1a to 25-1a calculated on the basis of the optimized camera parameter as "173", "169", "167", "177", and "170". When an initial value is assumed as 172, the predetermined range is "168 to 176". In this case, the parameter optimization unit 155 specifies the person 23-1a with the height "167" and the person 24-1a with the height "177".

In a case where the height of the specified person is equal to or higher than the initial value, the parameter optimization unit 155 adds a predetermined value to the height of the person and sets the added height as the second initial value. In a case where the height of the specified person is lower than the initial value, the parameter optimization unit 155 subtracts a predetermined value from the height of the person and sets the subtracted height as the second initial value. The predetermined value is assumed as one.

Description will be made as assuming the persons whose calculated height is not included in the predetermined range of the persons 21-1a to 25-1a as the persons 23-1a and 24-1a. The parameter optimization unit 155 optimizes the camera parameter of the camera 10 so as to reduce a difference between the first feature amount and the second feature amount for each of the persons 23-1a and 24-1a in a state where the heights L of the persons 23-1a and 24-1a are fixed. An initial value of a second camera parameter is assumed as an estimation result of a first camera parameter. The parameter optimization unit 155 outputs the result of the optimized camera parameter to the estimation unit 156.

Note that, in a case where there is no person whose calculated height is not included in the predetermined range among the persons 21-1a to 25-1a, the parameter optimization unit 155 skips the second processing and outputs a calculation result of the first camera parameter to the estimation unit 156.

The estimation unit 156 calculates the height of the person included in the image frame on the basis of the camera parameter acquired from the parameter optimization unit 155. The estimation unit 156 specifies the coordinates of the head and the coordinates of the foot of the person in the image coordinate system on the basis of the skeleton data. The estimation unit 156 projects the coordinates of the head and the coordinates of the foot of the person in the image coordinate system on the coordinates of the head and the coordinates of the foot of the person in the world coordinate system on the basis of the camera parameter. The estimation unit 156 calculates the distance from the coordinates of the foot in the world coordinate system to the coordinates of the head as the height of the person. The estimation unit 156 may display information regarding the calculated feature amount (height) of the person on the display unit 130 or may transmit the information to an external device.

Note that the estimation unit 156 may calculate a length of a predetermined portion of the person or the like as the feature amount of the person on the basis of the skeleton data and the camera parameter.

Figure 11:
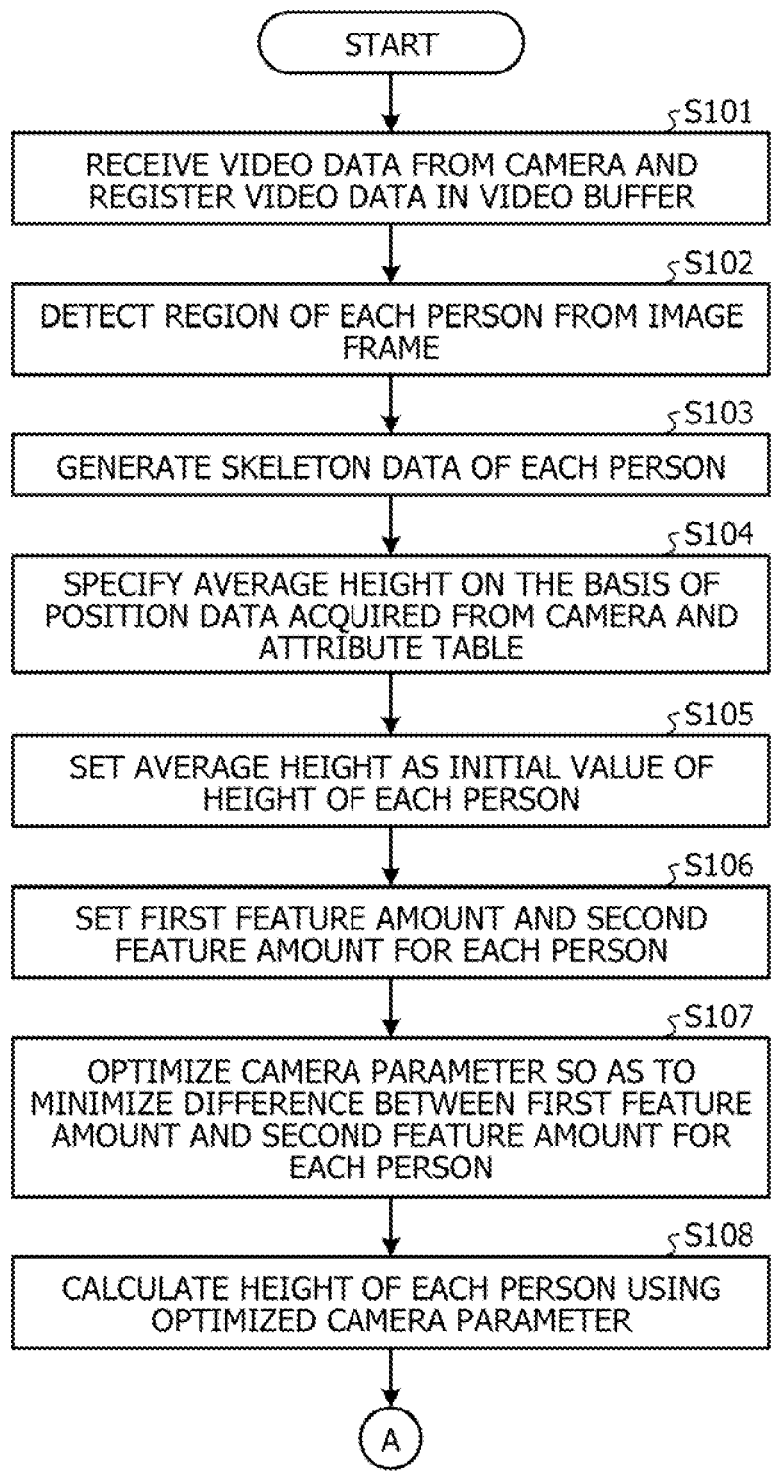
FIG. 11 is a flowchart (1) illustrating a processing procedure of the information processing apparatus according to the present embodiment.
Figure 12:
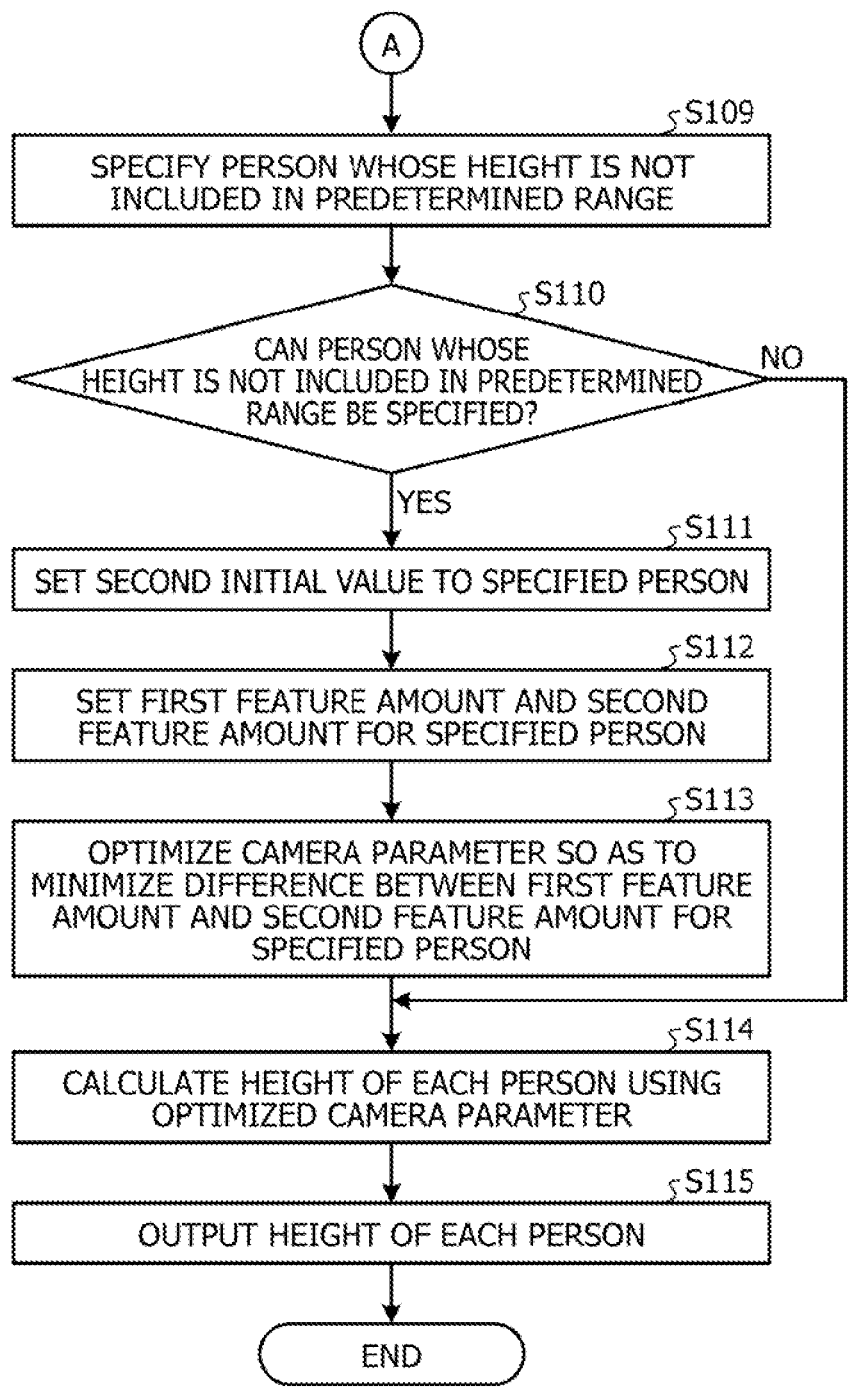
FIG. 12 is a flowchart (2) illustrating the processing procedure of the information processing apparatus according to the present embodiment.

Next, an exemplary processing procedure of the information processing apparatus according to the present embodiment will be described. FIGS. 11 and 12 are flowcharts illustrating a processing procedure of the information processing apparatus according to the present embodiment. First, FIG. 11 will be described. The acquisition unit 151 of the information processing apparatus 100 receives video data from the camera 10 and registers the video data in the video buffer 141 (step S101).

The detection unit 152 of the information processing apparatus 100 detects a region of each person from an image frame (step S102). The skeleton estimation unit 154 of the information processing apparatus 100 generates skeleton data of each person (step S103).

The setting unit 153 of the information processing apparatus 100 specifies an average height on the basis of position data acquired from the camera 10 and the attribute table 143 (step S104). The setting unit 153 sets the average height as an initial value of a height of each person (step S105).

The parameter optimization unit 155 of the information processing apparatus 100 sets a first feature amount and a second feature amount for each person (step S106). The parameter optimization unit 155 optimizes a camera parameter so as to minimize a difference between the first feature amount and the second feature amount for each person (step S107).

The parameter optimization unit 155 calculates the height of each person using the optimized camera parameter (step S108) and proceeds to step S109 in FIG. 12.

The description proceeds to FIG. 12. The parameter optimization unit 155 specifies a person whose height is not included in a predetermined range (step S109). In a case where the person whose height is not included in the predetermined range can be specified (step S110, Yes), the parameter optimization unit 155 proceeds to step S111. On the other hand, in a case where it is not possible to specify the person whose height is not included in the predetermined range (a case where heights of all persons are included in predetermined range) (step S110, No), the parameter optimization unit 155 proceeds to step S114.

The parameter optimization unit 155 sets a second initial value to the specified person (step S111). The parameter optimization unit 155 sets a first feature amount and a second feature amount to the specified person (step S112).

The parameter optimization unit 155 optimizes the camera parameter so as to minimize a difference between the specified first feature amount and second feature amount (step S113). The estimation unit 156 of the information processing apparatus 100 calculates a height of each person using the optimized camera parameter (step S114). The estimation unit 156 outputs the height of each person (step S115).

Next, effects of the information processing apparatus 100 according to the present embodiment will be described. The information processing apparatus 100 allocates a temporary average height to each person and estimates a camera parameter in the first processing. The information processing apparatus 100 specifies the person whose height specified from the estimation result of the camera parameter is not included in the predetermined range with reference to the average height and recalculates the second and subsequent camera parameters using the height of the specified person so as to determine the camera parameter. As a result, it is possible set the camera parameter, used to accurately calculate the height of the person, to the camera 10.

Figure 13:
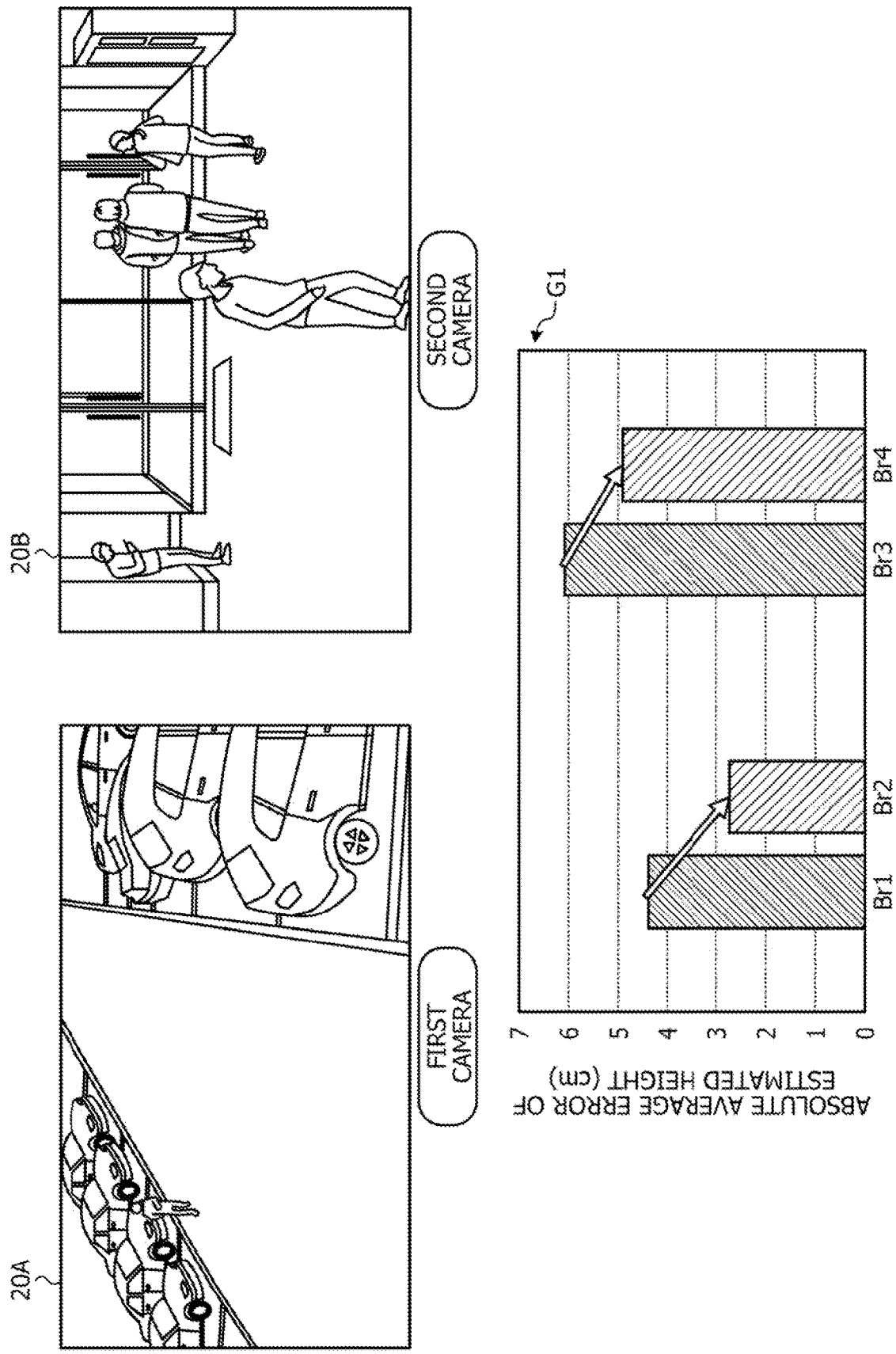
FIG. 13 is a diagram illustrating an estimation accuracy comparison result between the related art and the embodiment of the present application.

FIG. 13 is a diagram illustrating an estimation accuracy comparison result between the related art and the embodiment of the present application. The vertical axis in a graph G1 in FIG. 13 indicates an absolute average error (hereinafter, simply referred to as error) of an estimated height. Br1 indicates an error in a case where a height of a person is estimated using a method of the related art with respect to a video 20A imaged by a first camera. Br2 indicates an error in a case where a height of a person is estimated using the information processing apparatus 100 with respect to the video 20A imaged by the first camera. As illustrated in FIG. 13, when Br1 is compared with Br2, the error estimated by the information processing apparatus 100 is smaller.

Br3 indicates an error in a case where a height of a person is estimated using the method of the related art with respect to a video 20B imaged by a second camera. Br4 indicates an error in a case where a height of a person is estimated using the information processing apparatus 100 with respect to the video 20B imaged by the second camera. As illustrated in FIG. 13, when Br3 is compared with Br4, the error estimated by the information processing apparatus 100 is smaller.

The information processing apparatus 100 specifies a height of a person by projecting the coordinates of the foot portion and the head of the person included in the image frame on the coordinates in the world coordinate system on the basis of the camera parameter. As a result, the height according to the camera parameter can be accurately calculated from the image frame.

The information processing apparatus 100 specifies the coordinates of the foot portion and the head of the person in the image frame on the basis of the height of the person in the world coordinate system that is not included in the predetermined range and updates the camera parameter on the basis of a difference between the specified coordinates and the coordinates of the foot portion and the head of the person specified from the image frame. In this way, by optimizing the camera parameter using only the height of the person that deviates from the predetermined range, the camera parameter can be correctly estimated.

By the way, the information processing apparatus 100 according to the present embodiment specifies the person whose height specified from the estimation result of the camera parameter is not included in the predetermined range with reference to the average height and recalculates the second and subsequent camera parameters using the height of the specified person. However, the embodiment is not limited to this. The information processing apparatus 100 may optimize the camera parameter by increasing a weight of the height that is not included in the predetermined range than the height included in the predetermined range from among the heights of the plurality of persons included in the image frame.

For example, of the persons 21-1a to 25-1a described with reference to FIG. 5, a person whose calculated height is not included in the predetermined range is assumed as the persons 23-1a and 24-1a. A difference between the first feature amount and the second feature amount of each of the persons 21-1a, 22-1a, 23-1a, and 25-1a is assumed as a first difference. A difference between the first feature amount and the second feature amount of each of the persons 23-1a and 24-1a is assumed as a second difference. The parameter optimization unit 155 may optimize the camera parameter so as to reduce a value obtained by multiplying the first difference and the second difference by a weight α. This makes it possible to optimize the camera parameter as placing an emphasis on a statistically small difference.

Figure 14:
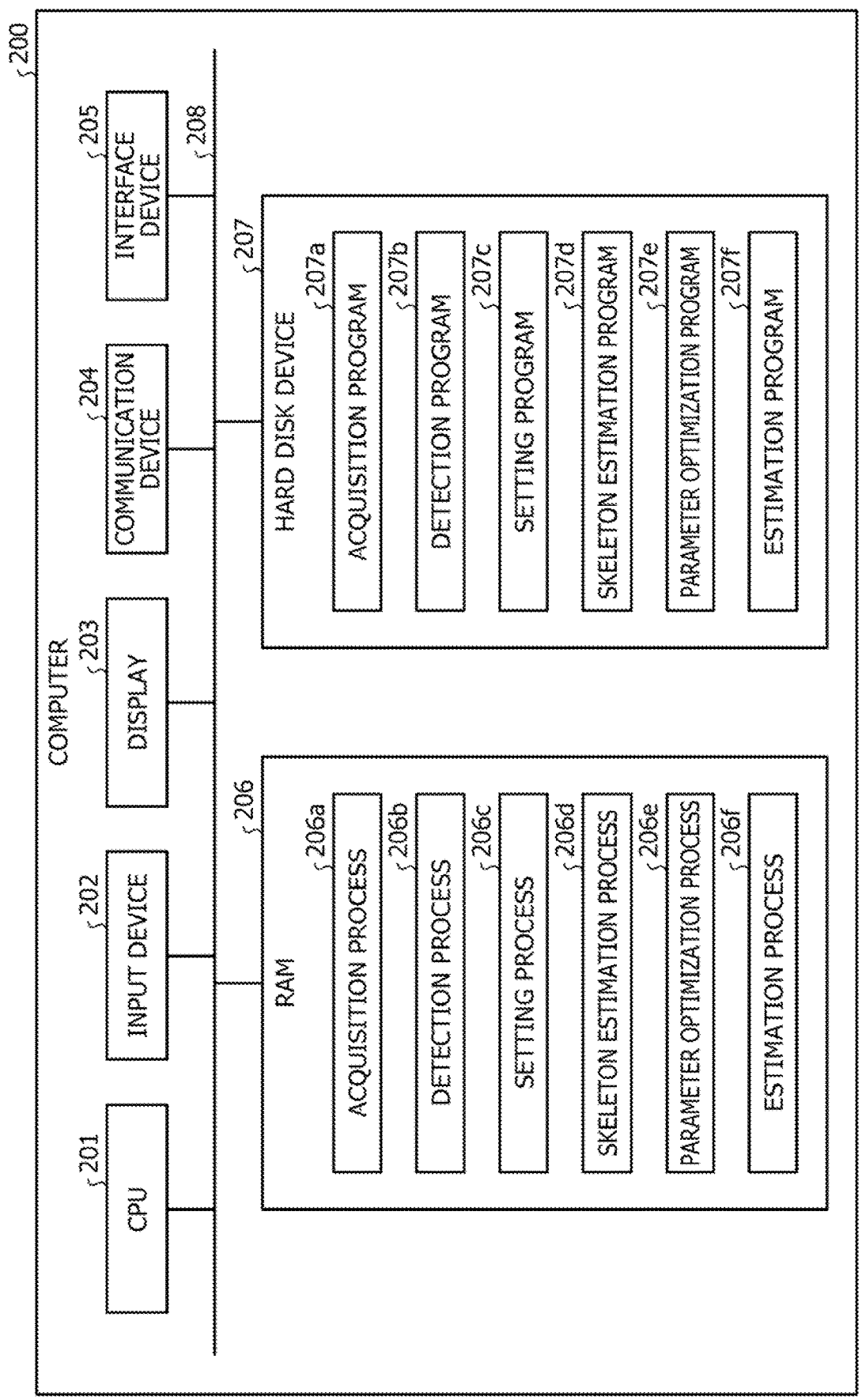
FIG. 14 is a diagram illustrating an example of a hardware configuration of a computer that implements functions similar to those of the information processing apparatus according to the embodiment.

Next, an example of a hardware configuration of a computer that implements functions similar to those of the information processing apparatus 100 indicated in the embodiment described above will be described. FIG. 14 is a diagram illustrating an example of the hardware configuration of the computer that implements the functions similar to those of the information processing apparatus according to the embodiment.

As illustrated in FIG. 15, a computer 200 includes a CPU 201 that executes various types of arithmetic processing, an input device 202 that receives data input from a user, and a display 203. Furthermore, the computer 200 includes a communication device 204 that exchanges data with the camera 10, an external device, or the like via a wired or wireless network and an interface device 205. Furthermore, the computer 200 includes a RAM 206 that temporarily stores various types of information, and a hard disk device 207. Then, each of the devices 201 to 207 is connected to a bus 208.

The hard disk device 207 includes an acquisition program 207a, a detection program 207b, a setting program 207c, a skeleton estimation program 207d, a parameter optimization program 207e, and an estimation program 207f. Furthermore, the CPU 201 reads each of the programs 207a to 207f and develops the program to the RAM 206.

The acquisition program 207a functions as an acquisition process 206a. The detection program 207b functions as a detection process 206b. The setting program 207c functions as a setting process 206c. The skeleton estimation program 207d functions as a skeleton estimation process 206d. The parameter optimization program 207e functions as a parameter optimization process 206e. The estimation program 207f functions as an estimation process 206f.

Processing of the acquisition process 206a corresponds to the processing of the acquisition unit 151. Processing of the detection process 206b corresponds to the processing of the detection unit 152. Processing of the setting process 206c corresponds to the processing of the setting unit 153. Processing of the skeleton estimation process 206d corresponds to the processing of the skeleton estimation unit 154. Processing of the parameter optimization process 206e corresponds to the processing of the parameter optimization unit 155. Processing of the estimation process 206f corresponds to the processing of the estimation unit 156.

Note that each of the programs 207a to 207f may not necessarily be stored in the hard disk device 207 in advance. For example, each of the programs may be stored in a "portable physical medium" to be inserted in the computer 200, such as a flexible disk (FD), a compact disc read only memory (CD-ROM), a digital versatile disc (DVD), a magneto-optical disk, and an IC card. Then, the computer 200 may read and execute each of the programs 207a to 207f.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an update program for causing a computer to execute processing comprising:
setting a range of a height of a person included in an image frame imaged by a camera on the basis of position information where the camera is provided;
specifying the height of the person included in the image frame based on a camera parameter of a position or a lens of the camera; and
updating the camera parameter based on a height of a person that is not included in the range in a case where the specified height of the person is not included in the range,
wherein the updating the camera parameter specifies a first feature amount from a foot portion to a head of the person in the image frame on the basis of a height of a person in the world coordinate system that is not included in the range and optimizes the camera parameter so as to minimize a difference between the first feature amount and a second feature amount from a foot portion to a head of a person specified from the image frame.

2. The non-transitory computer-readable recording medium according to claim 1, wherein the specifying the height of the person specifies the height of the person by projecting coordinates on a foot portion and a head of the person included in the image frame on coordinates in a world coordinate system based on the camera parameter.

3. The non-transitory computer-readable recording medium according to claim 1, wherein the updating the camera parameter updates the camera parameter by increasing a weight regarding the height that is not included in the range than the height included in the range among heights of a plurality of the persons included in the image frame.

4. An update method comprising:
setting, by a computer, a range of a height of a person included in an image frame imaged by a camera on the basis of position information where the camera is provided;
specifying the height of the person included in the image frame based on a camera parameter of a position or a lens of the camera; and
updating the camera parameter based on a height of a person that is not included in the range in a case where the specified height of the person is not included in the range,
wherein the updating the camera parameter specifies a first feature amount from a foot portion to a head of the person in the image frame on the basis of a height of a person in the world coordinate system that is not included in the range and optimizes the camera parameter so as to minimize a difference between the first feature amount and a second feature amount from a foot portion to a head of a person specified from the image frame.

5. The update method according to claim 4, wherein the specifying the height of the person specifies the height of the person by projecting coordinates on a foot portion and a head of the person included in the image frame on coordinates in a world coordinate system based on the camera parameter.

6. The update method according to claim 5, wherein the updating the camera parameter updates the camera parameter by increasing a weight regarding the height that is not included in the range than the height included in the range among heights of a plurality of the persons included in the image frame.

7. An information processing apparatus comprising:
a memory; and
a processor coupled to the memory and configured to:
set a range of a height of a person included in an image frame imaged by a camera on the basis of position information where the camera is provided;
specify the height of the person included in the image frame based on a camera parameter of a position or a lens of the camera; and
update the camera parameter based on a height of a person that is not included in the range in a case where the specified height of the person is not included in the range,
wherein a process to update the camera parameter specifies a first feature amount from a foot portion to a head of the person in the image frame on the basis of a height of a person in the world coordinate system that is not included in the range and optimizes the camera parameter so as to minimize a difference between the first feature amount and a second feature amount from a foot portion to a head of a person specified from the image frame.

8. The information processing apparatus according to claim 7, wherein the processor specifies the height of the person by projecting coordinates on a foot portion and a head of the person included in the image frame on coordinates in a world coordinate system based on the camera parameter.

9. The information processing apparatus according to claim 7, wherein the processor updates the camera parameter the imaging information by increasing a weight regarding the height that is not included in the range than the height included in the range among heights of a plurality of the persons included in the image frame.

\* \* \* \* \*